United States Patent
Wang et al.

(10) Patent No.: US 11,164,691 B2
(45) Date of Patent: Nov. 2, 2021

(54) SPLIT-BODY ELECTROMAGNET

(71) Applicant: Jing-Jin Electric Technologies Co., Ltd., Beijing (CN)

(72) Inventors: Ting Wang, Beijing (CN); Ping Yu, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 310 days.

(21) Appl. No.: 16/322,385

(22) PCT Filed: Jan. 20, 2017

(86) PCT No.: PCT/CN2017/071841
§ 371 (c)(1),
(2) Date: Jan. 31, 2019

(87) PCT Pub. No.: WO2018/032726
PCT Pub. Date: Feb. 22, 2018

(65) Prior Publication Data
US 2019/0189324 A1   Jun. 20, 2019

(30) Foreign Application Priority Data
Aug. 16, 2016   (CN) .......................... 201620890204.1

(51) Int. Cl.
*H01F 7/20* (2006.01)
*H01F 7/06* (2006.01)
(Continued)

(52) U.S. Cl.
CPC ................ *H01F 7/20* (2013.01); *H01F 7/06* (2013.01); *H01F 7/128* (2013.01); *H01F 27/02* (2013.01); *H01F 27/24* (2013.01); *H01F 27/28* (2013.01)

(58) Field of Classification Search
CPC ... H01F 7/20; H01F 7/06; H01F 7/128; H01F 27/02; H01F 27/24; H01F 27/28
See application file for complete search history.

(56) References Cited

U.S. PATENT DOCUMENTS 3,551,864 A * 12/1970 Spoldi ..................... H01F 27/02
336/83
3,775,718 A * 11/1973 Kanawa ..................... H01F 7/06
335/278
(Continued)

FOREIGN PATENT DOCUMENTS

CN    101615477 A    12/2009
CN    101887794 A    11/2010
(Continued)

OTHER PUBLICATIONS

CN204441020U Machine Translation.*
(Continued)

*Primary Examiner* — Mohamad A Musleh
(74) *Attorney, Agent, or Firm* — Fox Rothschild LLP; Carol E. Thorstad-Forsyth

(57) ABSTRACT

The present disclosure discloses a split-type electromagnet, wherein the split-type electromagnet comprises a housing and an iron core, the housing and the iron core are of a split type, wherein the iron core is fixed within the housing after the coil has been wound on the iron core, and the housing is a cylindrical body or an ellipsoidal body or a cross section of the housing is a sector-shaped ring or a rectangular ring. Compared with the integrated type of the housing and the iron core in the prior art, the winding of the coil of the electromagnet is more convenient. Furthermore, when the cross section of the housing of the electromagnet is a sector-shaped ring, a plurality of electromagnets are combined to form an electromagnet unit, and when the space is
(Continued)

restricted, the electromagnet unit may be used to complete the electromagnetic attraction.

7 Claims, 5 Drawing Sheets

(51) Int. Cl.
    *H01F 7/128*     (2006.01)
    *H01F 27/02*     (2006.01)
    *H01F 27/24*     (2006.01)
    *H01F 27/28*     (2006.01)

(56) References Cited

U.S. PATENT DOCUMENTS

| | | |
|---|---|---|
| 6,456,182 B1 | 9/2002 | Katayama et al. |
| 2010/0289606 A1 | 11/2010 | Li |

FOREIGN PATENT DOCUMENTS

| | | |
|---|---|---|
| CN | 202107845 U | 1/2012 |
| CN | 203931707 U | 11/2014 |
| CN | 204441020 U | 7/2015 |
| DE | 08604637 U1 | 8/1988 |
| JP | S48-072662 A | 10/1973 |
| JP | S48-038436 B1 | 11/1973 |
| JP | S48-097587 U | 11/1973 |
| JP | S48-097587 A | 12/1973 |
| JP | S50-043348 A | 4/1975 |
| JP | S52-161250 U | 12/1977 |
| JP | S53-051708 U | 5/1978 |
| JP | S53-083676 A | 7/1978 |
| JP | S53-083676 U | 7/1978 |
| JP | S54-101042 A | 8/1979 |
| JP | S55-094039 U | 6/1980 |
| JP | S62-056110 A | 3/1987 |
| JP | S62-078776 U | 5/1987 |
| JP | H01-119176 A | 5/1989 |
| JP | H01-119176 U | 8/1989 |
| JP | H04-069127 A | 3/1992 |
| JP | 2007162748 A | 6/2007 |
| WO | 2014/024240 A1 | 2/2014 |

OTHER PUBLICATIONS

Search Report issued in Japanese Patent Application No. 2019-508218 dated Mar. 10, 2020.

Notice of Reasons For Refusal issued in Japanese Patent Application No. 2019-508218 dated Mar. 24, 2020.

Supplemental European Search Report issued in EP 17840704 dated Aug. 16, 2019.

\* cited by examiner (a)          (b)

SPLIT-BODY ELECTROMAGNET

RELATED APPLICATION DATA

The present application is the U.S. National Phase of International Patent Application No. PCT/CN2017/071841, filed on Jan. 20, 2017 and entitled "SPLIT BODY ELECTROMAGNET," which claims priority to Chinese Patent Application No. CN 201620890204.1, filed on Aug. 16, 2016 and entitled "SPLIT BODY ELECTROMAGNET," the contents of which are incorporated herein by reference in their entireties.

TECHNICAL FIELD

The present disclosure relates to electromagnets, and particularly relates to a split-type electromagnet.

BACKGROUND

The electromagnets in the prior art comprise a housing and an iron core, and by winding a coil around the iron core and electrifying the coil, a magnetic force can be generated. However, the housing and the iron core are mostly of an integrated-type structure, and because the iron core is fixed within the housing, the winding of the coil around the iron core is very inconvenient.

Furthermore, the shapes of the housings of the electromagnets are mostly cylindrical bodies. For example, in the patent of the application number CN201310741008.9, the housing of the electromagnet is of a cylindrical shape. However, when the space is restricted, for example, in an electromagnetic clutch, when an electromagnet is required to be provided around the meshing gear, the electromagnet with the cylindrical housing is obviously not applicable.

SUMMARY

In view of the above problems, the present disclosure provides a split-type electromagnet to solve the problems of the conventional electromagnets that the winding of the coil around the iron core is inconvenient and that when the space is restricted the cylindrical housing is not applicable.

To achieve the above objects, the technical solutions of the present disclosure are realized as follows:

The present disclosure provides a split-type electromagnet, wherein the split-type electromagnet comprises a housing and an iron core, and a coil is wound around the iron core, wherein the housing and the iron core are of a split type, wherein the iron core is fixed within the housing after the coil has been wound around the iron core.

Optionally, the housing is a cylindrical body or an ellipsoidal body, and the iron core is a cylindrical body or ellipsoidal body that is concentric with the housing, and a bottom end of the iron core is provided with a bottom board that extends radially outwardly, and the bottom board covers a bottom end of the housing and extends further to a periphery of the housing to form a mounting base plate, or a bottom end of the iron core is provided with a mounting base plate that extends radially inwardly;

or, a bottom end of the housing is provided with a mounting base plate that extends radially outwardly and a bottom board that extends radially inwardly, and the bottom board covers a bottom end of the iron core.

Optionally, a cross section of the housing is a sector-shaped ring or a rectangular ring, the iron core is an arc-shaped structure or a rectangular structure, and a bottom end of the housing is provided with a bottom board, or a bottom end of the iron core is provided with a bottom board and the bottom board covers a bottom end of the housing.

Optionally, a connection of the iron core and the housing is provided with a plurality of threaded holes, and the iron core and the housing are connected by a plurality of screws.

Optionally, the mounting base plate is provided with a plurality of mounting holes, and the mounting holes are unthreaded holes.

Optionally, the bottom board is further provided with symmetrically two mounting positioning holes, and the mounting positioning holes are unthreaded holes;

a mounting hole is provided between the two mounting positioning holes, and the mounting hole is an unthreaded hole; and matching positioning pins are provided at a bottom of the iron core at positions that correspond to the mounting positioning holes, the positioning pins are sleeve pins, and after the iron core has been fixed within the housing the positioning pins protrude out of a bottom of the housing.

Optionally, a side of the housing is provided with a threading hole or a threading slot, and a terminal of the coil passes through the threading hole or the threading slot.

Optionally, an inner wall of the housing and an outer wall of the iron core are circumferentially provided with clipping grooves, and positions of the clipping grooves correspond to a top end of the coil; and after the iron core has been wound by the coil and fixed within the housing, the top end of the coil is infused with a glue or a molten rubber, plastic or nylon, and the glue, rubber, plastic or nylon after being solidified engages with the clipping grooves to fix the coil between the housing and the iron core.

Optionally, an end opening of an open end of the housing is provided with a blocking plate, to prevent axial displacement of the coil along the iron core.

Optionally, a plurality of electromagnets in which the cross section of the housing is a sector-shaped ring combine to form an electromagnet unit.

The advantageous effects of the present disclosure are: the present disclosure provides a split-type electromagnet, wherein the split-type electromagnet comprises a housing and an iron core, the housing and the iron core are of a split type, wherein the iron core is fixed within the housing after the coil has been wound around the iron core, and the housing is a cylindrical body or the cross section of the housing is a sector-shaped ring. Compared with the integrated type of the housing and the iron core in the prior art, the winding of the coil of the electromagnet is more convenient. Furthermore, when the cross section of the housing of the electromagnet is a sector-shaped ring, a plurality of electromagnets in which the cross section of the housing is a sector-shaped ring combine to form an electromagnet unit, and when the space is restricted, the electromagnet unit may be used to complete the electromagnetic attraction.

The above description is only an overview of the technical solutions of the present disclosure. In order to understand the technical means of the present disclosure more clearly, and to implement them according to the contents of the description, and in order to make the above and other objects, features and advantages of the present disclosure more fully understood, the particular embodiments of the present disclosure are provided below.

BRIEF DESCRIPTION OF DRAWINGS

By reading the detailed description of the preferable embodiments below, various other advantages and benefits will become clear to a person skilled in the art. The drawings are only for the purpose of illustrating the preferable embodiments, and are not considered as limitation to the present disclosure. Furthermore, throughout the drawings, the same reference signs denote the same elements. In the drawings.

DETAILED DESCRIPTION

Figure 1:
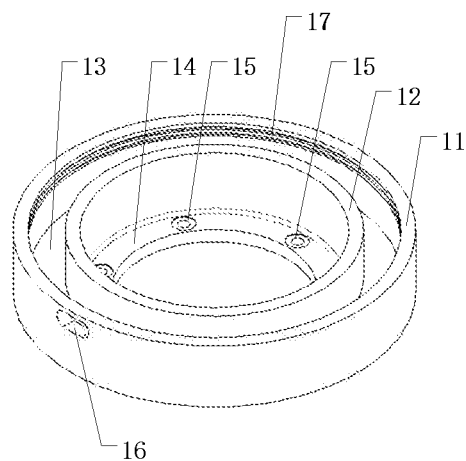
FIG. 1 is a schematic structural diagram of an electromagnet of a first embodiment of the present disclosure.

The exemplary embodiments of the present disclosure will be described in further detail below by referring to the drawings. Although the drawings illustrate the exemplary embodiments of the present disclosure, it should be understood that, the present disclosure can be implemented in various forms, which should not be limited by the embodiments illustrated herein. In contrast, the purpose of providing those embodiments is to more clearly understand the present disclosure, and to completely convey the scope of the present disclosure to a person skilled in the art.

The First Embodiment

Figure 2:
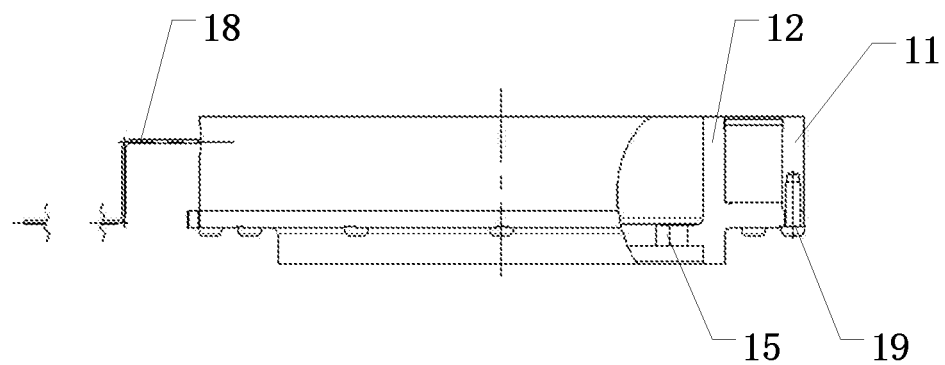
FIG. 2 is a sectional view of an electromagnet of the first embodiment of the present disclosure.
Figure 3:
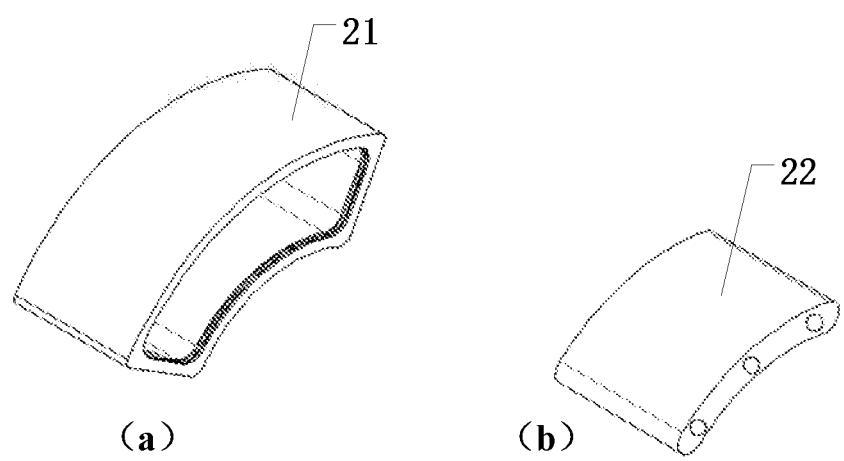
FIGS. 3(a) and 3(b) are respectively schematic structural diagrams of a housing and an iron core of an electromagnet of a second embodiment of the present disclosure.
Figure 4:
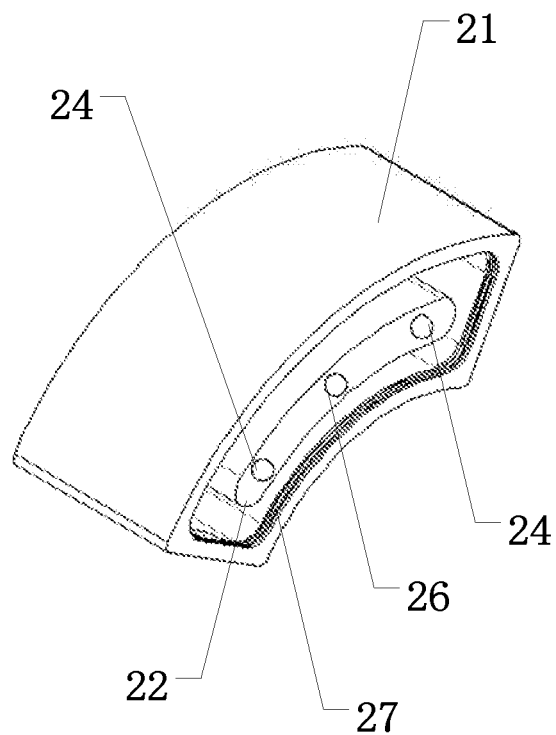
FIG. 4 is a schematic structural diagram of the electromagnet of the second embodiment of the present disclosure.
Figure 5:
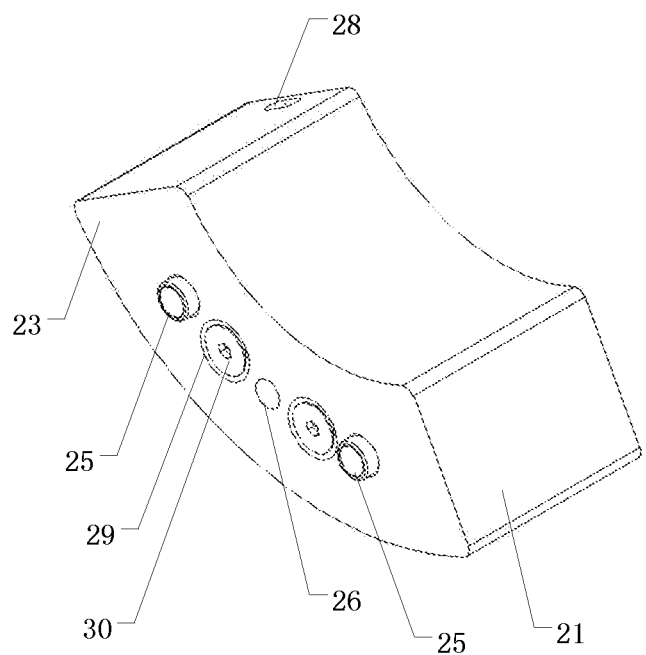
FIG. 5 is another schematic structural diagram of the electromagnet of the second embodiment of the present disclosure.
Figure 6:
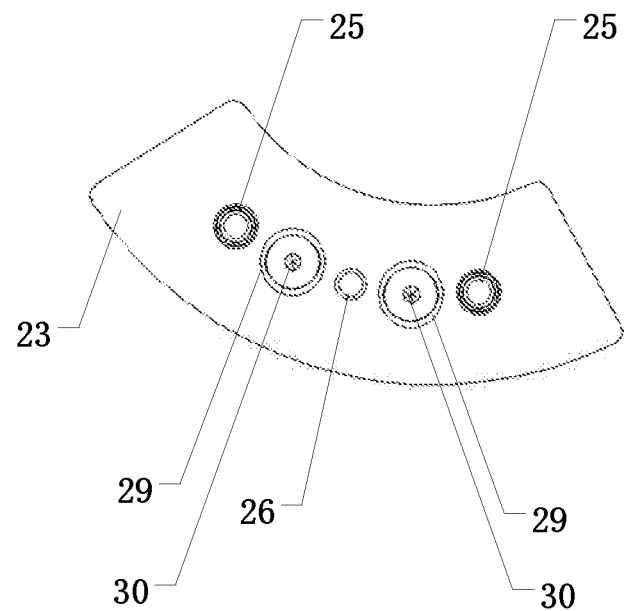
FIG. 6 is a top view of the electromagnet of the second embodiment of the present disclosure.
Figure 7:
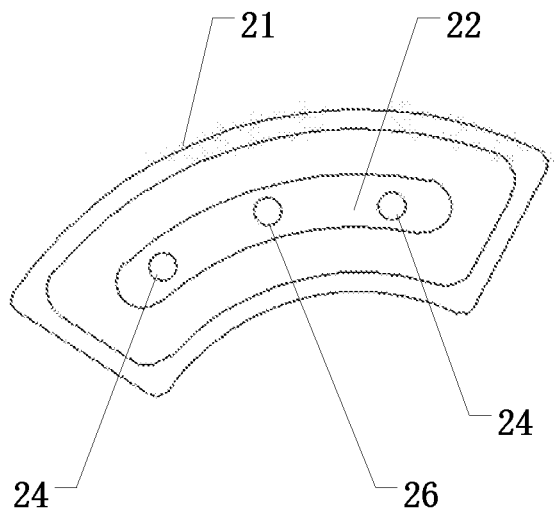
FIG. 7 is another top view of the electromagnet of the second embodiment of the present disclosure.
Figure 8:
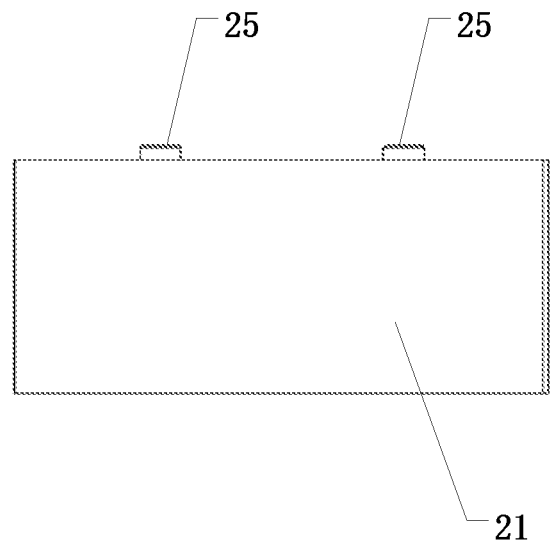
FIG. 8 is a side view of the electromagnet of the second embodiment of the present disclosure.
Figure 9:
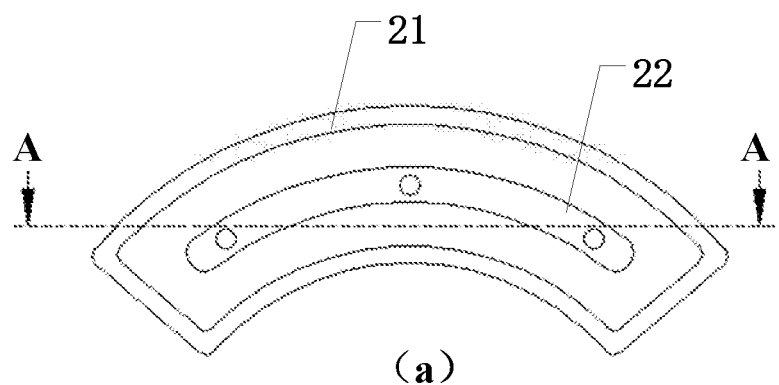
FIG. 9(b) is a sectional view of the plane A-A of the electromagnet of FIG. 9(a)
Figure 9:
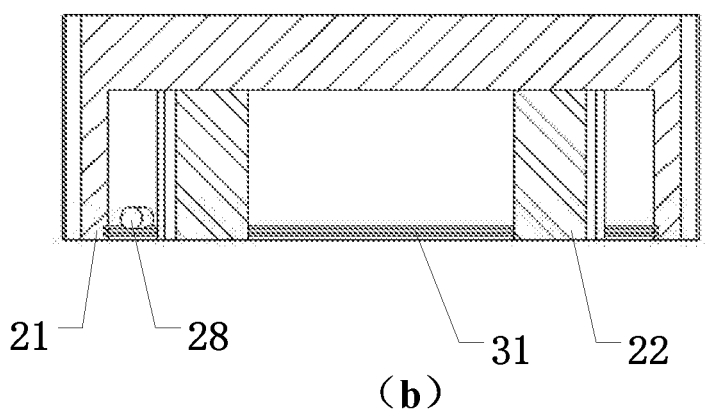

As shown in FIGS. 1 and 2 jointly, the first embodiment of the present disclosure provides a split-type electromagnet, wherein the split-type electromagnet comprises a housing 11 and an iron core 12, and a coil is wound around the iron core 12. The housing 11 and the iron core 12 are of a split type, wherein the iron core 12 is fixed within the housing 11 after the coil has been wound around the iron core 12. Compared with the integrated type of the housing 11 and the iron core 12 in the prior art, the winding of the coil is more convenient.

In the first embodiment of the present disclosure, the housing 11 is a cylindrical body, the iron core 12 is a cylindrical body concentric with the housing 11, the bottom end of the iron core 12 is provided with a bottom board 13 that extends radially outwardly, and the bottom board 13 extends and covers the bottom end of the housing 11. Certainly, the housing 11 may also be configured as an ellipsoidal body, and the iron core 12 is correspondingly an ellipsoidal body concentric with the housing 11 (not shown in the drawings). In a preferable embodiment of the present disclosure, the thickness of the part of the bottom board 13 that covers the bottom end of the housing 11 is less than that of the remaining part, and forms a clipping tab at the position, for positioning the bottom board 13 to the bottom end of the housing 11. Certainly, that is merely one of split positioning modes, and other positioning modes may also be used according to the particular demand. The position of the bottom board 13 that covers the bottom end of the housing 11 and the corresponding position of the housing 11 are provided with a plurality of threaded holes, and after the coil has been wound around the iron core 12 the iron core 12 is fixed within the housing 11 by using a plurality of screws 19. Certainly, other fixing modes may also be used, provided that the iron core can be fixed within the housing.

A side of the housing 11 is provided with a threading hole 16 or a threading slot (not shown in the drawings), and a terminal 18 of the coil passes through the threading hole 16 or threading slot. The threading slot refers to a notch provided at the open end of the housing 11, wherein the terminal of the coil is pressed into the notch and fixed, and the terminal more easily threads out. The shape of the threading hole 16 and threading slot may be configured according to the particular demand, provided that the terminal can thread out.

An inner wall of the housing 11 and an outer wall of the iron core 12 are circumferentially provided with clipping grooves 17, and the positions of the clipping grooves 17 correspond to the top end of the coil. After the iron core 12 has been wound by the coil and fixed within the housing 11, the top end of the coil is infused with a glue or a molten rubber, plastic or nylon, and the glue, rubber, plastic or nylon after being solidified engages with the clipping grooves 17 to fix the coil between the housing 11 and the iron core 12, to prevent the coil from axially displacing along the iron core 12 when being electrified and generating a magnetic force.

In a preferable embodiment of the present disclosure, the end opening of the open end of the housing 11 is provided with a blocking plate, which can also prevent the coil from axially displacing along the iron core 12 when being electrified and generating a magnetic force.

The bottom end of the iron core 12 is provided with a mounting base plate 14 that extends radially inwardly, or the bottom board 13 provided at the bottom end of the iron core 12 extends further to the periphery of the housing 11 to form a mounting base plate (not shown in the drawings). Alternatively, a bottom end of the housing is provided with a mounting base plate that extends radially outwardly and a bottom board that extends radially inwardly, and the bottom board covers the bottom end of the iron core (not shown in the drawings). That is, the mounting base plate and the bottom board may be provided at the bottom end of the housing, and may also be provided at the bottom end of the iron core.

The mounting base plate 14 is provided with a plurality of mounting holes 15, and the mounting holes 15 are unthreaded holes. When the electromagnet is being installed to other devices such as a clutch for use, the electromagnet is fixed at the usage position of the device by screwing screws into the mounting holes 15. Certainly, other fixing modes may also be used, provided that the electromagnet can be fixed to the device.

The Second Embodiment

As shown in FIGS. 3 to 9 jointly, the second embodiment of the present disclosure provides a split-type electromagnet, wherein the split-type electromagnet comprises a housing 21 and an iron core 22, and a coil 31 is wound around the iron core 22. The housing 21 and the iron core 22 are of a split type, wherein the iron core 22 is fixed within the housing 21 after the coil has been wound around the iron core 22.

In the second embodiment of the present disclosure, the cross section of the housing 21 is a sector-shaped ring. Alternatively, the edge of the housing 21 is provided with a plurality of projections to increase the attracting area of the electromagnet, and the cross section of the housing is still generally a sector-shaped ring. The bottom end of the housing 21 is provided with a bottom board 23, or, the bottom end of the iron core is provided with a bottom board and the bottom board covers the bottom end of the housing. That is, the bottom board may be provided at the bottom end of the housing, and may also be provided at the bottom end of the iron core. The iron core 22 is an arc-shaped structure. Certainly, an alternative configuration is that the cross section of the housing 21 is a rectangular ring, and the iron core 22 is correspondingly a rectangular structure (not shown in the drawings), or the cross sections of the housing 21 and of the iron core 22 are approximately a rectangular ring; for example, the square edges of the rectangle are provided with chamfers. A connection of the bottom end of the iron core 22 and the bottom board 23 of the housing 21 is provided with a plurality of threaded holes 29, and after the coil has been wound around the iron core 22 the iron core 22 is fixed within the housing 21 by using a plurality of screws 30. Certainly, other fixing modes may also be used, provided that the iron core can be fixed within the housing.

A side of the housing 21 is provided with a threading hole 28 or a threading slot (not shown in the drawings), and a terminal of the coil passes through the threading hole 28 or threading slot. The threading slot refers to a notch provided at the open end of the housing 21, wherein the terminal of the coil is pressed into the notch and fixed, and the terminal more easily threads out. The shape of the threading hole 28 and threading slot may be configured according to the particular demand, provided that the terminal can thread out.

The bottom board 23 of the housing 21 is further provided with symmetrically two mounting positioning holes 24, and the mounting positioning holes 24 are unthreaded holes. Matching positioning pins 25 are provided at the bottom of the iron core 22 at the positions that correspond to the mounting positioning holes 24, the positioning pins 25 are sleeve pins, and after the iron core 22 has been fixed within the housing 21 the positioning pins 25 protrude out of the bottom of the housing 21. On one hand, when the iron core 22 is being fixed within the housing 21, the protruding positioning pins 25 facilitate positioning the iron core 22 to a desired position. On the other hand, when the electromagnet is being installed to other devices such as a clutch for use, counterbores that match the positioning pins 25 are provided at the positions corresponding to the device, the protruding positioning pins 25 facilitate positioning the electromagnet to a desired position of the device. Moreover, because the positioning pins 25 are sleeve pins, they can fix the electromagnet to the device. It should be noted that, here the positioning pins are used for the positioning, and certainly other positioning modes such as split positioning may also be used according to the particular demand.

A mounting hole 26 is provided between the two mounting positioning holes 24, and the mounting hole 26 is an unthreaded hole. The corresponding position of the device is provided with a threaded hole, and a screw is screwed into the mounting hole 26 and the threaded hole, to further fix the electromagnet. Certainly, other fixing modes may also be used, provided that the electromagnet can be fixed to the device.

An inner wall of the housing 21 and an outer wall of the iron core 22 are circumferentially provided with clipping grooves 27, and the positions of the clipping grooves 27 correspond to the top end of the coil. After the iron core 22 has been wound by the coil and fixed within the housing 21, the top end of the coil is infused with a glue or a molten rubber, plastic or nylon, and the glue, rubber, plastic or nylon after being solidified engages with the clipping grooves 27 to fix the coil between the housing 21 and the iron core 22, to prevent the coil from axially displacing along the iron core 22 when being electrified and generating a magnetic force.

In a preferable embodiment of the present disclosure, the end opening of the open end of the housing 21 is provided with a blocking plate, which can also prevent the coil from axially displacing along the iron core 22 when being electrified and generating a magnetic force.

Figure 10:
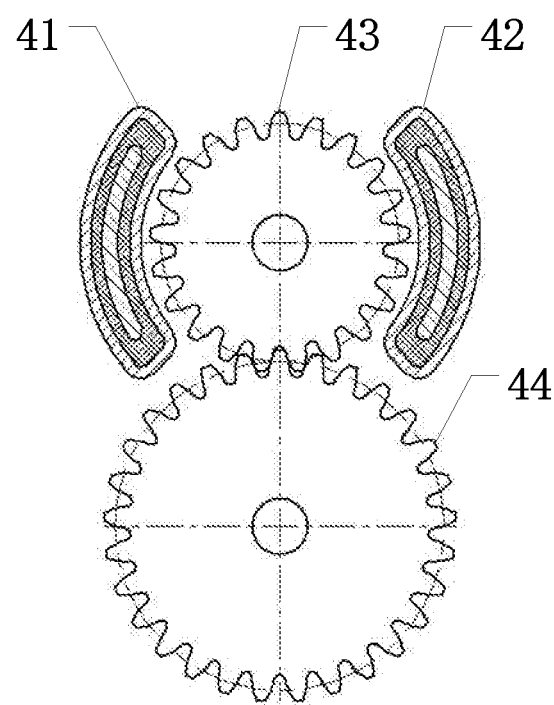
FIG. 10 is a sectional view of the electromagnet of the second embodiment of the present disclosure when applied to an electromagnetic clutch.

A plurality of electromagnets in which the cross section of the housing 21 is a sector-shaped ring combine to form an electromagnet unit. When the space is restricted, for example, as shown in FIG. 10, in an electromagnetic clutch, when an electromagnet is required to be provided around the meshing gear, symmetrically two above electromagnets 41, 42 may be provided at the periphery of the meshing gears 43, 44, to form an incomplete round ring, and the two electromagnets have a certain gap therebetween to facilitate the engaging of the gears 43, 44.

In conclusion, the advantageous effects of the embodiments of the present disclosure are: the embodiments of the present disclosure provide a split-type electromagnet, wherein the split-type electromagnet comprises a housing and an iron core, wherein the housing and the iron core are of a split type, wherein the iron core is fixed within the housing after the coil has been wound around the iron core, and the housing is a cylindrical body or the cross section of the housing is a sector-shaped ring. Compared with the integrated type of the housing and the iron core in the prior art, the winding of the coil of the electromagnet is more convenient. Furthermore, when the cross section of the housing of the electromagnet is a sector-shaped ring, a plurality of electromagnets are combined to form an electromagnet unit, and when the space is restricted, the electromagnet unit may be used to complete the electromagnetic attraction.

The above description is merely preferable embodiments of the present disclosure, and is not limiting the protection scope of the present disclosure. Any modifications, equivalent substitutions and improvements that are made within the spirit and principle of the present disclosure should fall within the protection scope of the present disclosure.

What is claimed is:

1. A split-type electromagnet, wherein the split-type electromagnet comprises a housing and an iron core, and a coil is wound around the iron core, wherein the housing and the iron core are of a split type, wherein the iron core is fixed within the housing after the coil has been wound around the iron core;

wherein a cross section of the housing is a sector-shaped ring, and the iron core is an arc-shaped structure; and wherein a side of the housing is provided with a threading hole or a threading slot, and a terminal of the coil passes through the threading hole or the threading slot.

2. The split-type electromagnet according to claim 1, wherein a bottom end of the housing is provided with a bottom board or a mounting base plate, or, a bottom end of the iron core is provided with a bottom board or a mounting base plate, and the bottom board covers a bottom end of the housing.

3. The split-type electromagnet according to claim 2, wherein a connection of the iron core and the housing is provided with a plurality of threaded holes, and the iron core and the housing are connected by a plurality of screws.

4. The split-type electromagnet according to claim 2, wherein the mounting base plate is provided with a plurality of mounting holes, and the mounting holes are unthreaded holes.

5. The split-type electromagnet according to claim 2, wherein the bottom board is further provided with symmetrically two mounting positioning holes, and the mounting positioning holes are unthreaded holes;

a mounting hole is provided between the two mounting positioning holes, and the mounting hole is an unthreaded hole; and matching positioning pins are provided at a bottom of the iron core at positions that correspond to the mounting positioning holes, the positioning pins are sleeve pins, and after the iron core has been fixed within the housing the positioning pins protrude out of a bottom of the housing.

6. The split-type electromagnet according to claim 1, wherein an inner wall of the housing and an outer wall of the iron core are circumferentially provided with clipping grooves, and positions of the clipping grooves correspond to a top end of the coil; and after the iron core has been wound by the coil and fixed within the housing, the top end of the coil is infused with a glue or a molten rubber, plastic or nylon, and the glue, rubber, plastic or nylon after being solidified engages with the clipping grooves to fix the coil between the housing and the iron core.

7. The split-type electromagnet according to claim 1, wherein a plurality of electromagnets in which the cross section of the housing is a sector-shaped ring combine to form an electromagnet unit.

\* \* \* \* \*